(No Model.)
F. AYER.
POTATO PLANTER.
No. 555,918. Patented Mar. 10, 1896.
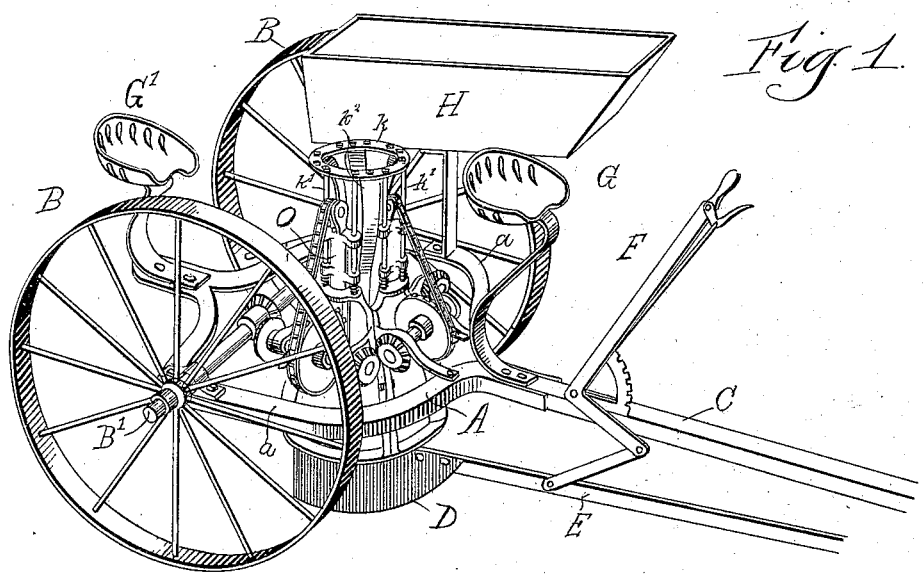
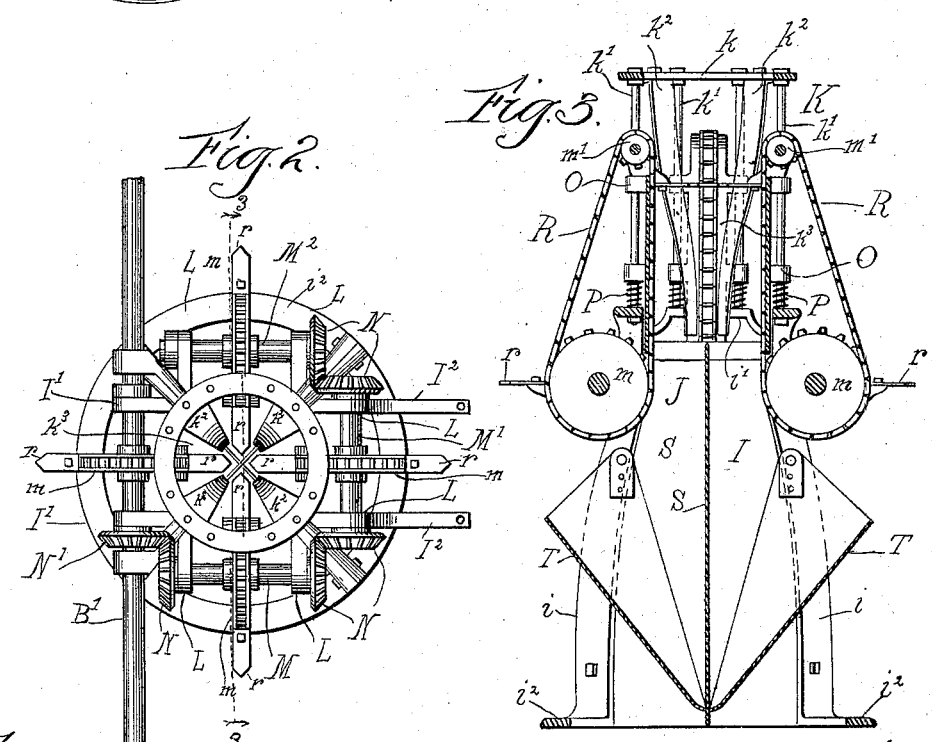
Witnesses
Inventor
Frederick Ayer
by Heekman Carnahan
Atty's

UNITED STATES PATENT OFFICE.

FREDERICK AYER, OF DOWNER'S GROVE, ILLINOIS.

POTATO-PLANTER.

SPECIFICATION forming part of Letters Patent No. 555,918, dated March 10, 1896.

Application filed April 15, 1895. Serial No. 545,833. (No model.)

*To all whom it may concern:*

Be it known that I, FREDERICK AYER, a resident of Downer's Grove, in the county of Du Page and State of Illinois, have invented certain new and useful Improvements in Potato-Planters; and I do hereby declare that the following is a full, clear, and exact description thereof, reference being had to the accompanying drawings, and to the letters of reference marked thereon, which form a part of this specification.

This invention relates to improvements in potato-planters of that class in which the potatoes fed into a suitable receptacle are automatically forced upon a stationary knife and thereby cut into suitable seed-pieces by means of feed mechanism driven from the wheel of a wheeled supporting-carriage.

More specifically, the present invention relates to an improved feed and cutting mechanism adapted for use in machines of the character above referred to.

Among the objects of the invention are to provide a strong and positive feed mechanism, to simplify the construction and thereby reduce the number and cost of parts, to obviate all liability of injury to the operator who supplies the seed to the device, to afford facility for readily changing the rate of feed, and to otherwise improve the machine, as will hereinafter more fully appear.

The invention consists in the matters hereinafter described, and more particularly pointed out in the appended claims, and will be readily understood from the following description, reference being had to the accompanying drawings, in which—

Figure 1 is a perspective view of a potato-planter embodying my invention. Fig. 2 is an enlarged plan view of the feed mechanism and driving connections therefor. Fig. 3 is a transverse vertical section taken on line 3 3 of Fig. 2.

Referring to said drawings, A designates as a whole the main frame of the machine; B B, the supporting-wheels; C, the tongue, and D E the usual plow or furrow-opener and its beam, respectively.

F designates the lever by means of which the plow is raised and lowered, G and G' the driver's and feeder's seats, respectively, and H the seed-receptacle from which the feeder transfers the potatoes to the feed mechanism, as hereinafter described.

Referring now more particularly to the construction and arrangement of the feed mechanism, it will be understood that the following is a description of one preferred form in which my invention may be embodied.

I designates as a whole an upright frame comprising four standards $i$ rigidly connected so as to stand in quadrangular relation and to diverge from top to bottom. The frame I is coveniently and as herein shown made in four similar segmental sections united at the vertical centers of the standards, each segmental section comprising horizontally-arranged upper and lower segmental bars $i'$ and $i^2$ respectively, which unite the two half-standards at top and bottom.

I' I' designate bearing-lugs extending rearwardly from the frame I, and provided with journal apertures or boxes through which passes the axle B' of the machine. $I^2$ $I^2$ are other lugs extending forwardly from the front part of the frame I and suitably secured to the main frame A of the machine, thereby suspending the said frame I in vertical position in front of the axle B' between the arms $a$ $a$ of the yoke-shaped frame A, and with the bell-shaped lower end of the frame I directly above the furrow-opener D.

J indicates a stationary cutter or knife arranged in the upper end of the frame I with its cutting-edge uppermost in such position that a potato forced downward through or within the upper end of the frame I will be cut or divided into a plurality of pieces or "seed-eyes." The particular cutter herein shown is of X shape, consisting of two straight knives extending diametrically across the top opening of the cone-shaped frame I and at right angles to each other. Obviously when the cutter is of this form the potato will be divided into four pieces in its passage downward within said frame. It will be plain, however, that the cutter may be of a different form from that herein shown and adapted to divide the potato into a greater or less number of pieces.

J' designates as a whole a hopper or guide-chute mounted upon the upper part of the frame I and adapted to direct the potatoes dropped therein accurately upon the cutter J. As constructed in the present instance said hopper comprises a circular casting or ring $k$ mounted horizontally upon the upper ends of a plurality of supporting-rods $k'$ $k'$ secured to and extending upwardly from the upper part of the frame I, as indicated clearly in Figs. 1 and 3. To the ring $k$ are secured four depending convergent guide-strips $k^2$, which extend downwardly to or near the upper end of the frame I. The said strips $k^2$ are spaced at equidistant intervals apart around the ring $k$, vertical space or opening $k^3$ being thus provided between each pair of adjacent strips.

Next describing the feed mechanism, by means of which the potatoes are automatically forced downward upon the cutter and into the cone-shaped frame I, these are as follows: L L designate pairs of bearing-lugs cast integral with or secured upon each of the two side and front segments of the frame I, the lugs L L of each segment being arranged to extend outward from the latter parallel with each other and at right angles to the lugs L L of the next adjacent segment. The lugs L L are each provided with transverse journal-apertures for the reception of shafts M M' M$^2$, which have secured upon their ends miter-gears N, of uniform diameter, adapted to intermesh with each other. With one of the gears N of the shaft M meshes a miter-gear N' secured upon the axle B' of the machine, thereby serving to drive all of the shafts M, M' and M$^2$ at a uniform speed when the machine is drawn forward. Upon the center of each of the shafts M M' M$^2$ and also upon the axle B', opposite the central part of the segment adjacent thereto, is rigidly mounted a sprocket-wheel $m$, and in the same vertical plane with each of said sprockets $m$, near the top of the chute J, is a guide-sprocket $m'$ mounted upon a vertically-sliding casting O, which slides upon the rods $k'$ $k'$ and is forced normally upward by means of coiled springs P interposed between the lower ends of the casting O and the upper end of the frame I.

R designates endless sprocket chain belts, one trained around the sprocket $m$ of each shaft M, M' or M$^2$, from thence upwardly and over the corresponding guide-sprocket $m'$ and down upon the inside of the hopper between the guide-strips thereof. Each of the sprocket-belts R is provided with a plurality of presser-fingers or projections $r$ $r$ extending rigidly outward from the belt, and these presser-fingers are preferably and as herein shown triangular in form and secured to the belt at the center of one of their three sides, so that the projecting angle of each presser-finger as it is carried past the cutter approximately fits and fills one of the four triangular spaces formed at the intersection of the crossed knives of the cutter. The presser-fingers $r$ of the several belts are spaced at uniform and equal distances apart, and inasmuch as the miter-gearing hereinbefore described insures that the several shafts will be driven positively together at a uniform speed it follows that if the several sprocket-belts be properly arranged so that the presser-fingers occupy the same relative positions each set of four of them (one on each belt R) will pass the cutter simultaneously. Obviously if a potato be resting upon the cutter when the presser-fingers are thus carried downward past the same by the movement of the belt it will be engaged by the several fingers simultaneously, forced downward upon the cutter and severed into four pieces.

Preferably and as shown herein the interior of the frame I below the cutter is divided by radial partitions S extending in the same vertical planes with the blades of the cutter, and therefore dividing the interior of the frame into four compartments. The four pieces of the potato drop into the said four compartments, respectively, each of which is provided with a deflector T, which directs the seed-eyes to the center of the frame, from whence they are directed to the space between the divergent blades of the furrow-opener in a familiar manner.

The use of the device will be obvious. As the machine is driven along by the driver the feeder takes the potatoes from the seed-receptacle H and drops them in the hopper one at a time and one between each set of revolving presser-fingers. These fingers, driven as described, force the potatoes upon the cutter and sever it into pieces which drop behind the plow and are covered by the earth closing over them.

From the foregoing it will be readily understood that I have devised an exceedingly simple and practical feed mechanism positive in its operation and so arranged that there is no possibility of the feeder being injured by the feed mechanism. At the same time the machine may be readily changed or regulated to plant at different intervals apart by simply supplying other sets of feed-belts having the presser-fingers at different intervals, no change of gearing or other changes being required.

As hereinbefore intimated, I do not wish to be limited to precise details of construction illustrated inasmuch as these may be varied to some extent without the exercise of more than ordinary mechanical skill. The details herein shown are, however, in themselves meritorious and are made the subject of specific claims as well as being included in the broader claims.

While I have herein shown a preferred form of embodying my invention, yet it will be obvious that various modifications may be made without involving more than ordinary mechanical skill—as, for instance, modifying the form of cutter and employing a less or greater number of feed-belts or the employment of sprocket-gearing to transmit the power from the axle in lieu of the miter-gearing herein shown. These and analogous changes I claim as within the scope of my invention.

I claim as my invention—

1. A feed mechanism for a potato-planter, or the like, comprising a hopper, an exit-passage for the escape of seed therefrom, a cutter arranged to divide said exit-passage and a rotary feeding device adapted to force the seed from the hopper and against the cutter.

2. A feed mechanism for potato-planters, or the like, comprising an upright hopper adapted for the passage of seed downward therethrough, a cutter arranged to divide the exit-passage of the hopper into a plurality of passages, a rotary feeding device adjacent to the cutter, seed-engaging devices carried by said rotary feeder and means for driving the latter.

3. A feed mechanism for potato-planters, or the like, comprising a stationary upright hopper adapted for the passage of seed downward therethrough, a cutter forming the seed-retaining bottom of the hopper, a rotary feeding device arranged adjacent to the cutter, projections thereon adapted to engage and carry the seed against the cutter and from the hopper and means for driving the rotary feeder.

4. A feed mechanism for potato-planters, or the like, comprising a hopper, a cutter arranged in the exit-passage of the hopper, an endless belt arranged to travel through the hopper and adapted to force the seed therefrom and against the cutter, and means for driving said belt.

5. A feed mechanism for potato-planters and the like, comprising a hopper, a cutter arranged in the exit-passage of the hopper, a plurality of endless belts arranged to travel through the hopper adjacent to the cutter, seed-engaging devices carried by each of said belts adapted to coact to force the seed upon the cutter and means for driving the belts.

6. A feed mechanism for a wheeled potato-planter, comprising an upright hollow frame, a fixed cutter secured in the upper part of said frame, a guide-hopper arranged above the cutter and adapted to direct the potatoes upon the cutter and means for feeding the potatoes to the cutter comprising horizontal shafts arranged adjacent to the upright frame, intermeshing miter-gears on said shafts, driving connections from the main axle of the machine, a driving sprocket-wheel on each of said shafts and a guide-sprocket mounted on a bearing supported on the hopper above the driving-sprocket and a sprocket-belt, provided with presser-fingers, trained about each driving and guide sprocket, substantially as set forth.

In testimony that I claim the foregoing as my invention I affix my signature in the presence of two witnesses.

FREDERICK AYER.

Witnesses:
W. M. SANTZ,
JAMES HECKMAN.